United States Patent [19]

Doner

[11] 4,215,963
[45] Aug. 5, 1980

[54] SELF-LOADING HAY-BALE-CARRYING TRAILER

[76] Inventor: Ralph L. Doner, Rte. 2, Atlanta, Mo. 63530

[21] Appl. No.: 7,226

[22] Filed: Jan. 26, 1979

[51] Int. Cl.² .............................................. B60P 1/08
[52] U.S. Cl. .................................... 414/24.5; 56/398; 298/20 R; 414/436; 414/485
[58] Field of Search ................... 414/24.5, 24.6, 338, 414/434, 435, 436, 485, 911; 298/20 R; 56/15.9, 16.1, 380, 397, 398

[56] References Cited

U.S. PATENT DOCUMENTS

| | | | |
|---|---|---|---|
| 970,304 | 9/1910 | Clagett | 414/436 |
| 1,563,685 | 12/1925 | Boys | 298/20 R |
| 2,185,794 | 1/1940 | Lewis | 56/16.1 |
| 2,373,710 | 4/1945 | Rutledge | 56/16.1 |
| 2,468,297 | 4/1949 | Jones | 414/436 |
| 3,938,682 | 2/1976 | Rowe | 414/24.5 |
| 4,062,454 | 12/1977 | Priefert | 414/442 X |

Primary Examiner—L. J. Paperner

Attorney, Agent, or Firm—Ralph F. Staubly

[57] ABSTRACT

A two-wheeled trailer has a V-shaped hay-bale-holding cradle pivoted about an axis closely above and parallel to the wheel axle. In its bale-loading position, parallel arms of the cradle extend rearwardly from the trailer and close to the ground for sliding under a large cylindrical bale when the trailer is backed-up by a tractor. The then-upright part of the cradle is tiltable forwardly and downwardly into its upright-V bale-carrying position in which it is automatically latched. The trailer is hitch-connected to a tractor by a tow-bar which is longitudinally extendably attached to the trailer chassis. A cable connects the cradle to the front end of the tow bar so that an extending pull thereon (when the wheel brakes are set) causes the cradle to tilt to its latched bale-carrying position. A latch normally holds the tow bar in its slightly extended hauling position. A brake-operating lever, and another lever for controlling the cradle and the tow-bar latches, are conveniently located within easy reach of the seated driver of a farm-type tractor.

8 Claims, 7 Drawing Figures

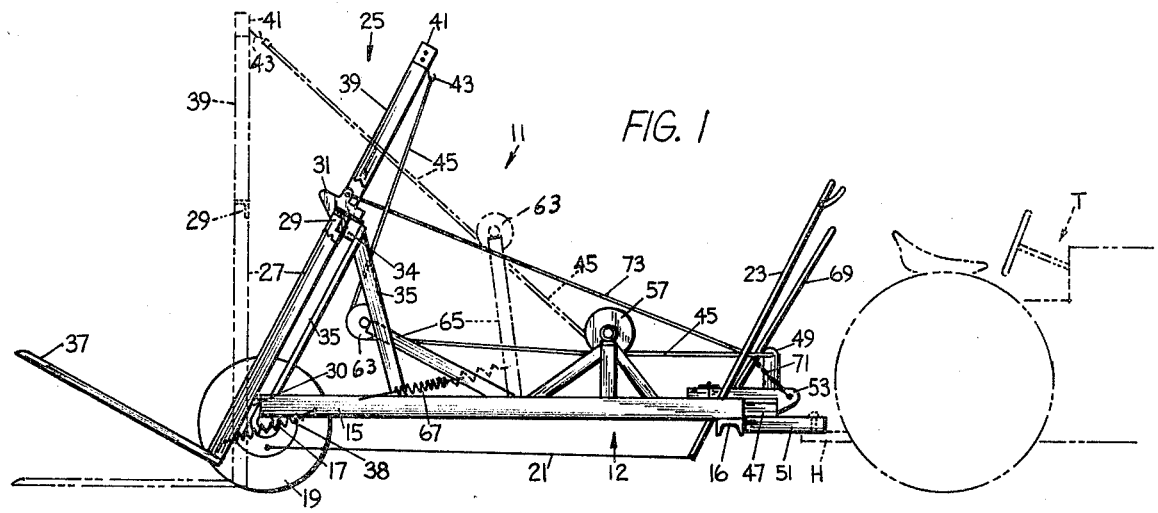
FIG. 1
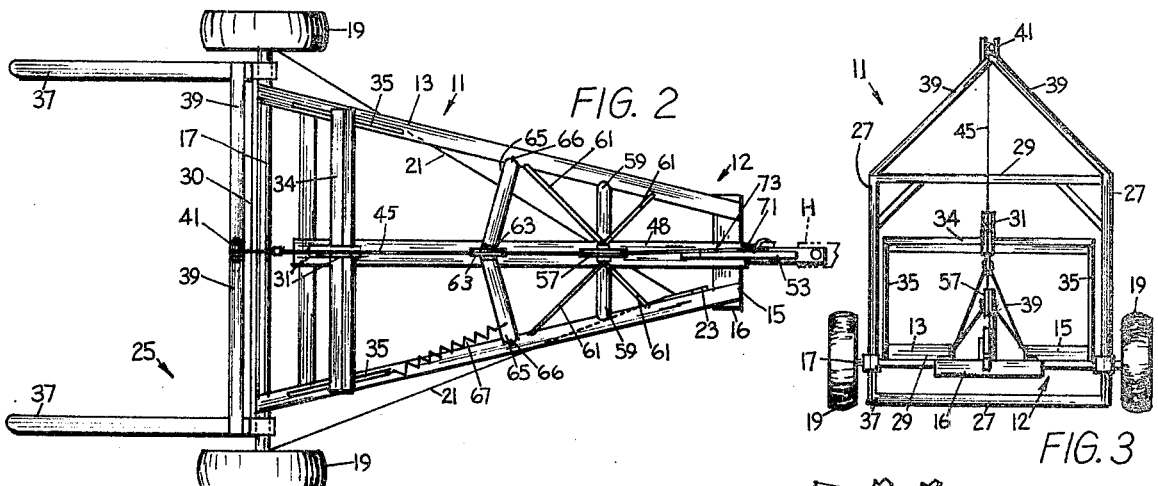
FIG. 2
FIG. 3
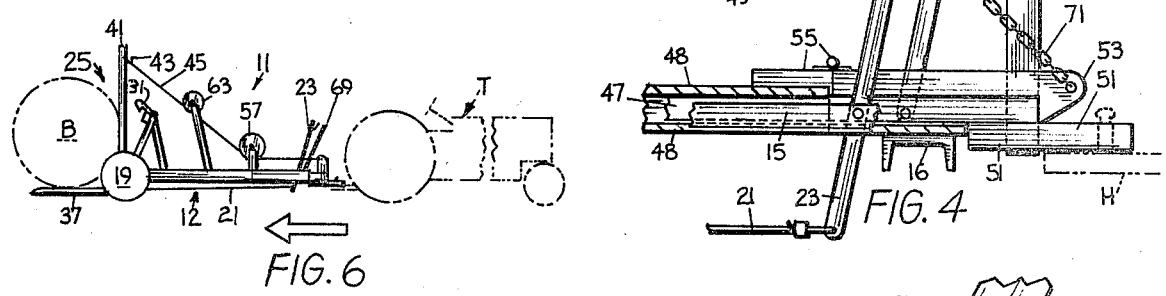
FIG. 4
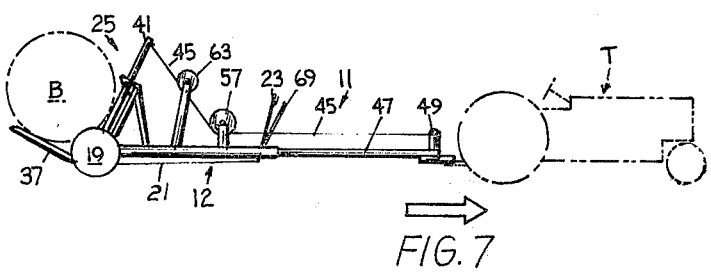
FIG. 6
FIG. 7
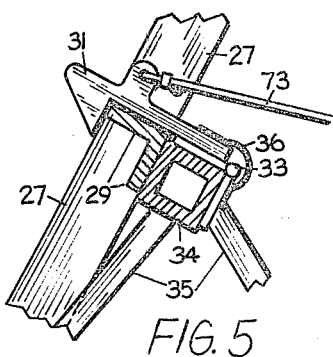
FIG. 5

SELF-LOADING HAY-BALE-CARRYING TRAILER

BACKGROUND AND OBJECTS OF THE INVENTION

There are known tiltable-cradle bale-carrying trailers which are made self-loading by complicated linkage systems operable by alternate backing and pulling thrusts by a tractor (e.g. U.S. Pat. Nos. 3,938,682 and 4,062,454). But no tiltable-cradle bale-carrier is known in which a sturdy triangular trailer chassis has a longitudinally limitedly movable tow bar and a cable operatively connecting the bar's forward end to a tiltable-cradle, to provide a very simple, sturdy, inexpensive and easily maintained bale-carrier, the provision of which bale-carrier is the principal object of this invention.

BRIEF DESCRIPTION OF THE DRAWINGS

FIG. 1 is a side elevational view of a preferred embodiment of the invention.

FIG. 2 is a plan view of the trailer of FIG. 1 in its phantom-shown condition.

FIG. 3 is an end elevational view of the trailer as seen from the left side of FIG. 2.

FIG. 4 is an enlarged fragmentary side elevational view of the hitch end of the trailer.

FIG. 5 is an enlarged fragmentary elevational view of the cradle-latching mechanism of FIG. 1.

FIG. 6 is a mostly schematic side view showing bale engagement produced by the backing-up of the trailer by the tractor.

FIG. 7 is a mostly schematic side view showing the tilting of the cradle to bale-holding position by the tractor-pulled cable.

DETAILED DESCRIPTION

With reference now to the drawings, the numeral 11 generally designates the self-loading bale-carrying trailer, which is adapted for quick and easy coupling to a farm-type tractor T having a conventional hitch member H. The tractor has a rigid (triangular-in-plan) chassis 12 formed of metallic side bars 13 and 15, a front bar 16, and a transverse rear axle assemblage 17. The axle assemblage includes two pneumatic-tired wheels 19 each having conventional brakes (not shown) controlled by cables 21. A brake lever 23, which is pivotedly connected to the front end of the chassis 12, is shown (for clarity) as having an extended lower end connected to the brake cables 21, which lower end would in practice be better omitted, with the cables 21 being connected above the lever's pivot.

A bale-holding cradle 25 is formed of an upright angle-bar frame 27 which is pivotally connected to a rear transverse chassis bar 30 for swinging forwardly and downwardly through about 45° where it is stopped and held by a frame-triggered cam-tipped latch element 31 (FIG. 5) which engages a frame bar 29. The latch element 31 is mounted by a hinge 33 on a transverse bar 34 which is fixed to the chassis bars 13 and 15 by two pairs of inverted-V-shaped members, each formed of a pair of angle-bars 35 welded (or bolted) at their ends to the bar 34 and to the chassis bars 13 and 15. A leaf or equivalent spring 36 insures latching.

The lower horizontal angle-bar of the cradle frame 27 has a plurality of parallel rearwardly extending flat rods 37 welded thereto at right angle to the plane of the frame 27 so as to lie against the ground when the frame 27 is upright and so as to be slidable under a hay bale when the trailer is backed toward it for loading. A tensioned coil spring 38 biases the cradle downwardly.

The upright cradle frame 27 has an upper extension formed by converging bars 39 which are joined at their apex by a member 41. The member 41 carries a swivelled hook 43 for attachment of a cable 45 by which the cradle 25 is tilted to its FIG. 7 position by forward movement of the tractor T relative to the trailer with its brakes set. The cable-pulling action is made possible by the novel use of an extensible (squared) tow-bar 47 which is telescopically held and guided in a tube 48 (or equivalent means) medially and longitudinally fixed to the chassis 12. The cable 45 is fastened to the front end of the tow-bar 47, as by a welded-on short bar 49. The lower end of the short bar 49 also helps (by welding) to anchor the trailer part 51 of the conventional tow-hitch H to the tow-bar 47. A latch 53 hinged at 55 retains the tow-bar in its normal retracted position of FIGS. 1,2 and 6.

The cable 45 is guided for horizontal pulling by a pulley 57 which is mounted on a horizontal axis transverse of the chassis. The pulley axis is fixed between the upper ends of bars 59, which are braced by rods 61. Slack in the cable 45 during the hauling phase is taken up by a pulley 63 mounted between arms 65. The arms 65 are pivotally connected at 66 to the chassis bars 13 and 15 and are pulled downwardly toward their phantom-shown positions of FIG. 1 by a coil spring 67.

A second lever 69 (also conveniently within reach of the seated tractor operator) is pivotally connected to the front of the chassis 12 for controlling the cradle-locking latch 31 and the two-bar-locking latch 53. A flexible element (chain 71) couples the lever 69 to the tow-bar latch 53, while a cable 73 connects the lever 69 to the self-setting cradle latch 31.

MODE OF OPERATION

The full-line disclosure of FIG. 1 shows the trailer 11 with its parts in storage or empty transporting condition. A pull on the lever 69 (and thus the latch 31) will release the cradle 25 for movement as by a biasing spring 38 to its phantom-shown position of FIG. 1 so that the trailer can be backed into the bale-engaging condition of FIG. 6. Next the lever 23 is moved to set the wheel brakes, the lever 69 is pushed rearwardly to release the tow-bar latch 53, and the tractor T is driven to its FIG. 7 position relative to the trailer, in which position the latch 31 automatically locks the bale-holding cradle. Finally, the tractor is backed to bring it and the trailer into the parts-conditions shown in FIG. 4 and in phantom in FIG. 1 for transporting (after releasing the wheel brakes) the hay-bale B.

The invention having been described, what is claimed is:

1. A self-loading hay-bale-carrier trailer comprising: a relatively rigid chassis, a pair of wheels supporting said chassis and being mounted on axle means close to the rear end of said chassis, brake means for preventing undesired chassis movement, a tiltable V-shaped bale-holder cradle pivotally attached to the rear of said chassis on an axis close to and parallel to the axis of said axle means, said cradle being swingable to cause its rear portion to lie close to ground level for back-up sliding under a hay-bale and said cradle being swingable upwardly and forwardly into bale-carrying position, automatic means for latching and holding said cradle in its bale-carrying position, a cable for pulling said cradle into its bale-carrying position, a draw-bar axially limitedly longitudinally movable forwardly relatively to said chassis, means for automatically latching said draw-bar in its non-extended position, and hitch means for coupling said draw-bar to a conventional tractor, said cable being connected to the front end of said draw bar, whereby a pull by said tractor on the unlatched draw bar with said brake means set will cause said cradle to swing upwardly toward its automatically latched bale-carrying position and whereby backing said tractor will cause said draw bar to latch automatically in its non-extended position for bale-transporting movement of said trailer after release of said brake means.

2. A trailer according to claim 1, said brake means being conventional wheel-brakes.

3. A trailer according to claim 2, said wheel brakes including control means operable by a tractor driver while seated on the tractor seat.

4. A trailer according to claim 1, said brake means including control means operable by a tractor driver while seated on the tractor seat.

5. A trailer according to claim 4 and additionally comprising means for unlatching at least one of said latching means and operable by a tractor driver while seated on the tractor seat.

6. A trailer according to claim 5, said unlatching means being a single upstanding lever connected to the front portion of said chassis.

7. A trailer according to claim 6 and additionally comprising a second upstanding lever connected to the front of said chassis and reachable by a tractor-seated driver for controlling operation of said brake means.

8. A trailer according to claim 1 and additionally comprising a pulley mounted on a spring-biased swinging support for taking-up slack in the pull cable.

* * * * *